United States Patent Office 3,053,898
Patented Sept. 11, 1962

3,053,898
PREPARATION OF KETONES FROM SECONDARY ALCOHOLS
Carl E. Heath, Jr., Nixon, and Robert M. Skomoroski, Elizabeth, N.J., assignors to Esso Research and Engineering Company, a corporation of Delaware
No Drawing. Filed July 21, 1959, Ser. No. 828,468
6 Claims. (Cl. 260—596)

The present invention relates to the dehydrogenation of organic compounds, and particularly to the dehydrogenation of secondary alcohols to ketones. More specifically, it is concerned with an improved process wherein secondary aliphatic alcohols are converted to ketones by means of a platinum catalyst supported on activated carbon.

The dehydrogenation of secondary alcohols to ketones may be carried out in the vapor phase over a solid catalyst. The alcohol is usually first vaporized and then passed through a reaction zone containing discrete particles of catalyst. Among the most widely used catalysts in this process are oxides of the group II metals in the Periodic Chart of Elements (Lange's Handbook of Chemistry, 8th edition, pages 56–57) and certain group I compounds, such as copper salts. While these catalysts are highly suitable for converting lower molecular weight, secondary alcohols to ketones, such as methyl ethyl ketone, their efficiency and selectivity are substantially reduced when higher molecular weight secondary alcohols are employed as the feed. The above-mentioned catalysts have a tendency to cause dehydration rather than dehydrogenation of the alcohol when the feed comprises a $C_6$ or higher alcohol.

It is an object of the present invention to provide a process for converting higher molecular weight secondary monohydric alcohols to ketones at elevated temperatures without causing any substantial amount of dehydration of the alcohols.

It has now been discovered that a platinum catalyst supported on activated carbon will almost quantitatively convert higher molecular weight secondary alcohols to ketones at elevated temperatures. While the process may be carried out at temperatures of 400° to 750° F., the highest conversions and greatest selectivity are obtained at temperatures between about 550° and 650° F. At the latter temperatures the conversion of alcohol is generally more than 90%, and under optimum conditions it is 100%. The selectivity to the respective ketone is outstanding, being up to about 99% in the case of hexanol-2.

In practicing the present invention, a feed containing substantial amounts of secondary $C_6$–$C_{16}$ aliphatic alcohols is vaporized and introduced into a reaction zone containing discrete particles of platinum on activated carbon. The catalyst in the reaction zone may be either a fixed or fluid bed. If a fixed bed is employed, the particles may have an average size of between $3/32$ and $3/16$ inch, while in a fluid bed operation, the particles must be finely divided, e.g. an average particle size of about 10 to 80 microns. The form of the catalyst is not important so long as there is adequate surface, e.g. about 500 to 1500 square meters per gram, to permit intimate contact with the reactants.

It is essential that the activated carbon used to support the platinum be substantially free of acidic substances such as oxides, chlorides, bromides, nitrates, etc., since these tend to cause dehydration of the secondary alcohol. The catalyst may be applied to the activated carbon carrier by any conventional means such as treating it with a concentrated solution of chloroplatinic acid and drying it in an inert atmosphere. The treated catalyst should be activated by heating it at an elevated temperature, e.g. 800° to 1000° F. for about 5 to 15 hours in a hydrogen atmosphere and then for a short period in a substantial vacuum.

The feed may comprise either pure secondary alcohol or it may contain up to 60 or 80 wt. percent diluent. The diluent is preferably a $C_6$ to $C_{16}$ saturated hydrocarbon such as hexane, heptane or cyclohexane. If desired, the feed may be a refinery stream, such as a hydrated mixed $C_6$ olefin stream, containing about 20–40% normal and branched isomers from the catalytic cracker. The olefin in the stream can be hydrated at 70–100° F. and about 80–100 p.s.i.g. with 75–80 wt. percent sulfuric acid, and hydrofined to remove sulfur which reduces the life of the catalyst. The alcohols may be fractionated or separated by molecular sieves to recover secondary alcohol feeds which are highly suitable for the present process.

The pressure in the reaction zone is not critical and may be varied between 0 and 150 p.s.i.g., although it is preferred to employ pressures of 10 to 100 p.s.i.g. The feed is passed through the reaction zone at a velocity of about 0.05 to 10 volumes of feed per volume of catalyst per hour (v./v./hr.). The products which are almost exclusively acyclic ketones and hydrogen are withdrawn from the reaction zone and cooled sufficiently to permit easy recovery of the liquid ketones. The catalyst, which may contain from about 0.01 to 20 wt. percent platinum, has a long life and need not be regenerated. For instance, the preferred catalyst, which consists of 0.5 to 10 wt. percent of platinum on activated carbon, has a life of about 6–12 months under optimum operating conditions.

While any saturated secondary monohydric alcohol containing between 6 and 16 carbon atoms may be converted to a ketone in accordance with the present invention, the process has special application to the $C_6$ to $C_8$ secondary alcohols. These alcohols are light enough to be easily converted to ketones without employing any extraordinary conditions. Among the alcohols which may be employed in this process are hexanol-2, hexanol-3, octanol-2, octanol-3, decanol-2, dodecanol-2, tetradecanol-2 and hexadecanol-2.

The following examples are given to specifically show how the process of the present invention may be carried out.

EXAMPLE 1

One wt. percent platinum on activated carbon catalyst was prepared as follows:

Activated carbon (500 ml.) of about 4 to 8 mesh was dried in a nitrogen atmosphere for 5 hours at 1000° F. The dried carbon was then permitted to cool to room temperature in the same atmosphere. The dried carbon (171 g.) was then saturated with 4.275 g. of 40 wt. percent chloroplatinic acid in 150 ml. of water and the saturated carbon was allowed to stand overnight exposed to the atmosphere. It was then placed in an oven and heated to 250° F. in a nitrogen atmosphere. After 24 hours, the catalyst was removed from the oven and then activated by heating it at 800° F. for 13.3 hours in a hydrogen atmosphere and then in a vacuum.

The activated platinum catalyst (51 g.) was placed in a 193 cc. reactor equipped with a thermometer and heated to maintain the temperature within the reactor vessel at the desired level. In each run hexanol-2 was vaporized by heating it to 282–286° F. under atmospheric pressure and then passed downwardly over the fixed catalyst bed at a space velocity of 0.13 v./v./hr. The vaporized alcohol was contacted with the catalyst particles at atmospheric pressure and collected in a vessel connected to the bottom of the reactor. All runs were carried out with the same catalyst. The results recorded during the several runs are set forth in the following table.

*Dehydrogenation of Hexanol-2*

| Run No. | Temp., °F. | Organic Layer, ml. | Water Layer, ml. | Gas, CF at 78° F. | Wt. Percent Hexanone-2 in Organic Layer | Wt. Percent Conv. Hexanol-2 | Wt. Percent Selectivity to Hexanone-2 |
|---|---|---|---|---|---|---|---|
| 1 | 300 | 4.9 | 0.2 | -------- | 6.5 | 6.5 | 90 |
| 2 | 600 | 9.7 | 0.2 | 0.027 | 91.6 | 91.0 | 98.7 |
| 3 | 600 | 6.3 | 0.2 | 0.023 | 97.0 | 100 | 96.9 |
| 4 | 800 | 3.3 | 0.3 | 0.014 | 57.6 | 95 | 55.6 |

The data show that the optimum temperature for carrying out the dehydrogenation is about 600° F. At this temperature the conversion of the alcohol is high and its selectivity to hexanone-2 is extremely good. While the selectivity remains fairly high even at lower temperatures (run 1) the conversion is quite low. On the other hand, at higher temperatures (run 4) the conversion is high but the selectivity is poor.

EXAMPLE 2

Run No. 3 in the above example is repeated using heptanol-2 as the feed.

The ketones prepared in accordance with the present invention are excellent solvents for many substances, including vinyl resins and acrylonitrile. They may also be used in the formulation of lacquers and other finishes, as well as in the processing of natural and synthetic fibers.

It is not intended to restrict the present invention to the foregoing embodiment, but rather it should only be limited by the appended claims in which it is intended to claim all the novelty inherent in the invention.

What is claimed is:

1. A process for converting a secondary aliphatic alcohol having 6 to 16 carbon atoms to the corresponding aliphatic ketone which comprises passing said alcohol in the form of a vapor over a catalyst consisting of platinum on activated carbon at a temperature of 400° to 750° F. and a pressure of about 0–150 p.s.i.g. and recovering the ketone formed.

2. A process for converting a secondary aliphatic alcohol having 6 to 16 carbon atoms to the corresponding aliphatic ketone which comprises passing said alcohol in the form of a vapor over a catalyst consisting of 0.01 to 20 weight percent platinum on activated carbon at a temperature of 400° to 750° F. and a pressure of about 0–150 p.s.i.g. and recovering the ketone formed.

3. A process according to claim 2 in which the temperature is 550° to 650° F.

4. A process according to claim 2 in which the secondary aliphatic alcohol is a $C_6$ to $C_8$ alcohol.

5. A process according to claim 2 in which the secondary aliphatic alcohol is hexanol-2 and the temperature is 550° to 650° F.

6. A process for dehydrogenating a secondary aliphatic alcohol having 6 to 8 carbon atoms to the corresponding aliphatic ketone which comprises passing said alcohol in the form of a vapor over a bed of discrete catalyst particles consisting of 0.5 to 10 weight percent platinum on activated carbon at a space velocity of about 0.05 to 10 v./v./hr. under about atmospheric pressure and at a temperature of 550° to 650° F. and recovering the ketone formed.

References Cited in the file of this patent

UNITED STATES PATENTS 2,083,877   Steck et al. ------------ June 15, 1937